(12) United States Patent
Sishtla et al.

(10) Patent No.: US 12,130,375 B2
(45) Date of Patent: Oct. 29, 2024

(54) RADAR SYSTEM AND METHOD USING PRIORITY BASED ROUTING OF RADAR DATA

(71) Applicant: Rockwell Collins, Inc., Cedar Rapids, IA (US)

(72) Inventors: Venkata A. Sishtla, Cedar Rapids, IA (US); Kevin M Kronfeld, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 344 days.

(21) Appl. No.: 17/705,896

(22) Filed: Mar. 28, 2022

(65) Prior Publication Data

US 2023/0305100 A1    Sep. 28, 2023

(51) Int. Cl.
  *G01S 7/00*     (2006.01)
  *G01S 13/95*    (2006.01)
(52) U.S. Cl.
  CPC ............ *G01S 7/003* (2013.01); *G01S 13/953* (2013.01)
(58) Field of Classification Search
  CPC ........ G01S 13/953; G01S 7/003; Y02A 90/10
  See application file for complete search history.

(56) References Cited

U.S. PATENT DOCUMENTS

| | | | |
|---|---|---|---|
| 9,622,252 B2 | 4/2017 | Kadiyala et al. | |
| 9,934,621 B2 | 4/2018 | Gremmert et al. | |
| 10,153,812 B2 | 12/2018 | Zelst et al. | |
| 10,222,452 B2 | 3/2019 | Bisti et al. | |
| 10,779,216 B1 | 9/2020 | Lindsley et al. | |
| 2010/0302093 A1* | 12/2010 | Bunch ................ | H04B 7/18502 342/26 B |
| 2020/0295821 A1 | 9/2020 | Wang et al. | |
| 2021/0067241 A1 | 3/2021 | Mohideen et al. | |
| 2021/0243639 A1 | 8/2021 | Sanaullah et al. | |
| 2021/0314806 A1 | 10/2021 | Menon et al. | |
| 2022/0388534 A1* | 12/2022 | Schneemann ........ | G05D 1/0214 |
| 2023/0131160 A1* | 4/2023 | Davalos ................ | G01S 13/426 342/26 B |

* cited by examiner

*Primary Examiner* — Timothy X Pham
(74) *Attorney, Agent, or Firm* — Suiter Swantz IP

(57) ABSTRACT

A system including a radar receiver and a processor onboard an aircraft. The processor may be configured to: receive or generate weather radar data; identify an end user computing device to receive the weather radar data; determine whether the end user computing device has a high priority or low priority need for the weather radar data; reduce a size and/or an amount of the weather radar data to be a portion of the weather radar data; and upon a determination that the end user computing device has the low priority need for the weather radar data, route, via a datalink, the portion of the weather radar data having the reduced size and/or reduced amount of the weather radar data to the end user computing device.

13 Claims, 6 Drawing Sheets

RADAR SYSTEM AND METHOD USING PRIORITY BASED ROUTING OF RADAR DATA

BACKGROUND

Availability of onboard weather radar is important for connected aircraft architectures. The radar is capable of outputting a variety of information like reflectivity, threats, etc. However, currently, due to radar data's memory size, the use of this information for connectivity is limited to higher bandwidth channels which might not always be available on an aircraft. For example, when using a very high frequency (VHF) datalink, currently, the data can only transmit radar data with very limited functionality, which might not be relevant for a given mission.

SUMMARY

In one aspect, embodiments of the inventive concepts disclosed herein are directed to a system. The system may include a radar receiver installed onboard an aircraft and at least one processor installed onboard the aircraft and communicatively coupled to the radar receiver. The at least one processor may be configured to: receive or generate weather radar data based on signals received by the radar receiver; identify an end user computing device to receive at least a portion of the weather radar data; determine whether the end user computing device has a high priority need for the weather radar data or a low priority need for the weather radar data, wherein the low priority need is relatively low as compared to the high priority need, wherein for the low priority need, the at least the portion of the weather radar data is a portion of the weather radar data having a reduced size and/or reduced amount of the weather radar data that satisfies a low priority weather radar data need of the end user computing device, wherein for the high priority need, a size and/or amount of the at least the portion of the weather radar data is more than the reduced size and/or reduced amount associated with the low priority weather radar data need so as to satisfy a high priority weather radar data need of the end user computing device; reduce a size and/or an amount of the weather radar data to be the portion of the weather radar data; and upon a determination that the end user computing device has the low priority need for the weather radar data, route, via a datalink, the portion of the weather radar data having the reduced size and/or reduced amount of the weather radar data to the end user computing device.

In a further aspect, embodiments of the inventive concepts disclosed herein are directed to a method. The method may include: receiving or generating, by at least one processor communicatively coupled to a radar receiver, weather radar data based on signals received by the radar receiver, the radar receiver and the at least one processor installed onboard an aircraft; identifying, by the at least one processor, an end user computing device to receive at least a portion of the weather radar data; determining, by the at least one processor, whether the end user computing device has a high priority need for the weather radar data or a low priority need for the weather radar data, wherein the low priority need is relatively low as compared to the high priority need, wherein for the low priority need, the at least the portion of the weather radar data is a portion of the weather radar data having a reduced size and/or reduced amount of the weather radar data that satisfies a low priority weather radar data need of the end user computing device, wherein for the high priority need, a size and/or amount of the at least the portion of the weather radar data is more than the reduced size and/or reduced amount associated with the low priority weather radar data need so as to satisfy a high priority weather radar data need of the end user computing device; reducing, by the at least one processor, a size and/or an amount of the weather radar data to be the portion of the weather radar data; and upon a determination that the end user computing device has the low priority need for the weather radar data, routing, by the at least one processor via a datalink, the portion of the weather radar data having the reduced size and/or reduced amount of the weather radar data to the end user computing device.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
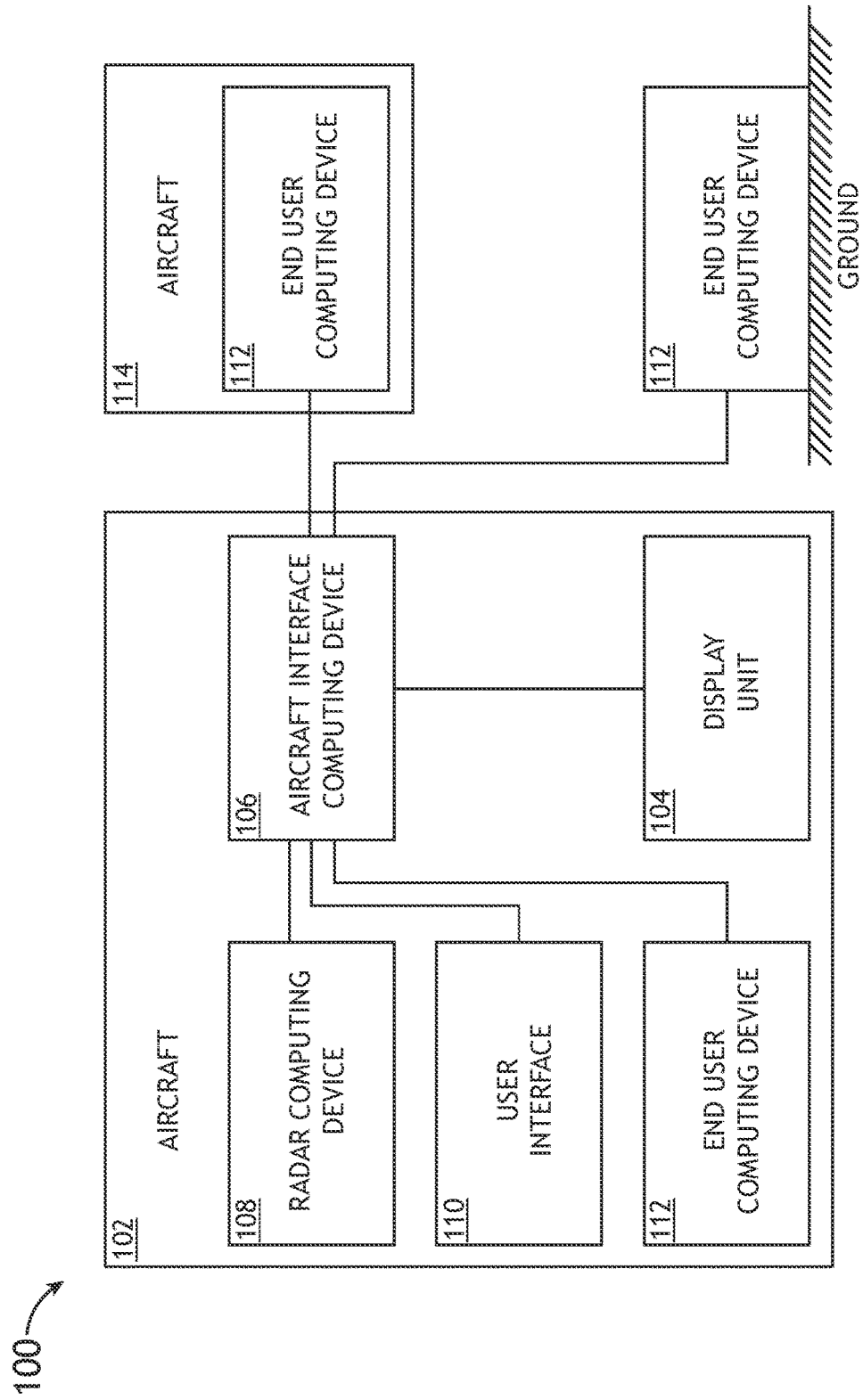
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system (e.g., an aircraft system) and a method configured to: determine (e.g., based at least on a mission or mission requirements) whether an end user computing device has a high priority need or a low priority need for radar data (e.g., weather radar data); and one of: (a) if the end user computing device has the low priority need for the radar data, route, via a datalink (e.g., a low bandwidth datalink or a high bandwidth datalink), a portion of the radar data having a reduced size and/or reduced amount of the radar data to the end user computing device, or (b) if the end user computing device has the high priority need for the radar data, route, via a datalink (e.g., a low bandwidth datalink or a high bandwidth datalink), an amount of the radar data to the end user computing device so as to fulfill the high priority need for the radar data.

In some embodiments, a data payload and/or the communication channel can be tailored to meet end-user needs. The radar or aircraft system sending data through a datalink can be configured to adjust a compression technique or sampling rate of data, based on priority and available bandwidth of datalink. For example, when only a VHF datalink is available, the output data can be heavily compressed or decimated by selecting only valid radials and bins of weather radar data so as to provide a broader view of a threat. In some embodiments, a lower bandwidth channel (e.g., VHF) can be used during times of minimal weather activity, and a higher bandwidth channel (e.g., a satellite communication (SATCOM) datalink, etc.) can be use in bursts during heavy weather activity. In some embodiments, such a hybrid approach may allow a use of a smaller communication channel while transmitting more data over a period of time than existing radar data routing.

In some embodiments, data from the weather radar is an important piece of information for connected aircraft and autonomy. Tailoring the data to meet the end user's needs (e.g., high-resolution data for meteorological models as compared to low-resolution data or threat-only data for decision aids) allows a downlink of valuable and meaningful weather data over an available channel. In some embodiments, such a hybrid approach can provide and/or expand the use of connected aircraft to aircraft where high bandwidth channels are not or not always available. Additionally, such embodiments can reduce costs of making connectivity available for more aircraft.

Referring now to FIGS. 1-5, an exemplary embodiment of a system 100 according to the inventive concepts disclosed herein is depicted. In some embodiments, the system 100 may include an aircraft 102, at least one other aircraft 114, and/or at least one end user computing device 112, some or all of which may be communicatively coupled at any given time. The aircraft 102 may include at least one user (e.g., flight crew and/or pilot(s)), at least one display unit computing device 104, at least one aircraft interface computing device 106 (e.g., an aircraft router computing device), at least one radar computing device 108 (e.g., a weather radar computing device, such as an electronically scanned array (ESA) weather radar computing device), at least one radar receiver 401 (e.g., a weather radar receiver), at least one user interface 110, and/or at least one end user computing device 112, some or all of which may be communicatively coupled at any given time. In some embodiments, the at least one display unit computing device 104, the at least one aircraft interface computing device 106, the at least one radar computing device 108, and/or the at least one user interface 110 may be implemented as a single computing device or any number of computing devices configured to perform (e.g., collectively perform if more than one computing device) any or all of the operations disclosed throughout. For example, the at least one display unit computing device 104, the at least one aircraft interface computing device 106, the at least one radar computing device 108, and/or the at least one user interface 110 may be installed in the aircraft 102. In some embodiments, the at least one display unit computing device 104, the at least one user interface 110, the end user computing device 112, and/or a user (e.g., a remote pilot or remote crewmember) may be located offboard of the aircraft 102, for example, if a given aircraft 102 is a remote piloted aircraft (e.g., an unmanned aerial vehicle (UAV) or a drone aircraft).

For example, the user may be a pilot or crew member. The user may interface with the system 100 via the at least one user interface 110. The at least one user interface 110 may be implemented as any suitable user interface, such as a control panel, a touchscreen (e.g., of the display unit computing device 104 and/or another display unit), a multipurpose control panel, a control panel integrated into a flight deck, a cursor control panel (CCP) (sometimes referred to as a display control panel (DCP)), a keyboard, a mouse, a trackpad, at least one hardware button, a switch, an eye tracking system, and/or a voice recognition system. The user interface 110 may be configured to receive at least one user input and to output the at least one user input to a computing device (e.g., 104, 106, and/or 108). For example, a pilot of the aircraft 102 may be able to interface with the user interface 110 to: make a user selection and/or make a mode selection for the display unit computing device 104. For example, such user inputs may be output to the radar computing device 108 and/or the display unit computing device 104.

Figure 2:
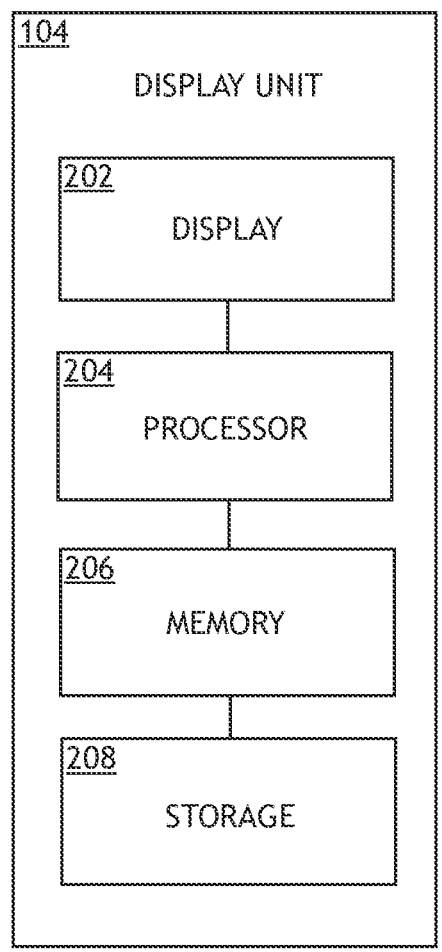
FIG. 2 is a view of an exemplary embodiment of a display unit computing device of the system of FIG. 1 according to the inventive concepts disclosed herein.

The display unit computing device 104 may be implemented as any suitable computing device, such as a primary flight display (PFD) computing device, a weather radar display computing device (e.g., a vertical situation display (VSD) computing device and/or a horizontal situation display), and/or a multi-function window (MFW) display computing device. In some embodiments, the display unit computing device is an end user computing device 112, such as if the display unit computing device is a VSD computing device. As shown in FIG. 2, the display unit computing device 104 may include at least one display 202, at least one processor 204, at least one memory 206, and/or at least one storage 208, some or all of which may be communicatively coupled at any given time. For example, the at least one processor 204 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 204 may include a CPU and a GPU configured to perform (e.g., collectively perform) any of the operations disclosed throughout. The processor 204 may be configured to run various software applications (e.g., a weather radar display application, a PFD application, and/or an MFW application) or computer code stored (e.g., maintained) in a non-transitory computer-readable medium (e.g., memory 206 and/or storage 410) and configured to execute various instructions or operations. The processor 204 may be configured to perform any or all of the operations disclosed throughout. For example, the processor 204 may be configured to: receive radar data (e.g., weather radar data). The display 202 may be configured to display graphical information associated with the radar data (e.g., the weather radar data).

Figure 3:
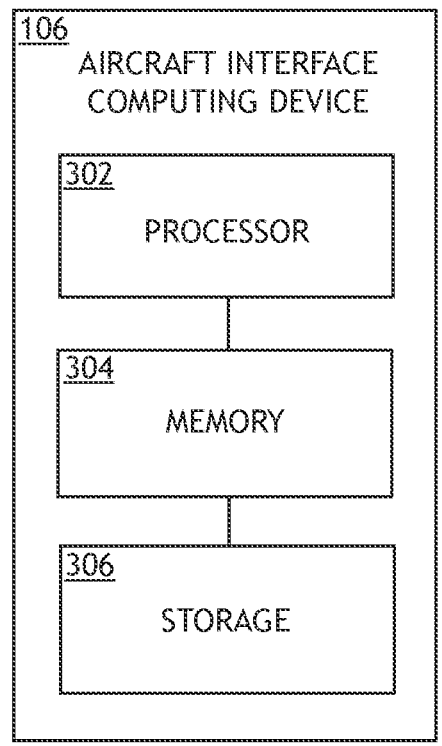
FIG. 3 is a view of an exemplary embodiment of an aircraft interface computing device of the system of FIG. 1 according to the inventive concepts disclosed herein.
Figure 4:
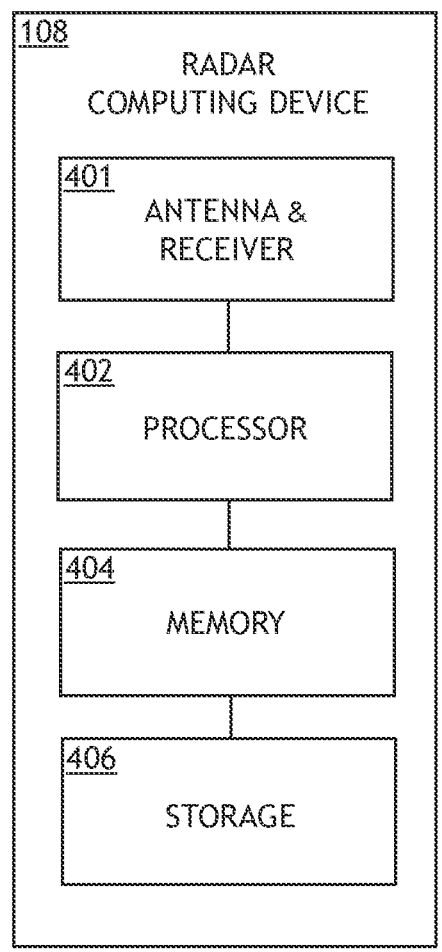
FIG. 4 is a view of an exemplary embodiment of a radar computing device of the system of FIG. 1 according to the inventive concepts disclosed herein.

The at least one aircraft interface computing device 106 may be implemented as any suitable computing device, such as an aircraft router computing device (e.g., a flight operation and maintenance exchange (FOMAX) computing device or a smart router). The at least one aircraft interface computing device 106 may include any or all of the elements, as shown in FIG. 3. For example, the aircraft interface computing device 106 may include at least one processor 302, at least one memory 304, and/or at least one storage 306, some or all of which may be communicatively coupled at any given time. For example, the at least one processor 302 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 302 may include a CPU and a GPU configured to perform (e.g., collectively perform) any of the operations disclosed throughout. The processor 302 may be configured to run various software applications or computer code stored (e.g., maintained) in a non-transitory computer-readable medium (e.g., memory 304 and/or storage 306) and configured to execute various instructions or operations. The processor 302 of the aircraft computing device 106 may be configured to perform any or all of the operations disclosed throughout. For example, the processor 302 of the computing device 106 may be configured to: determine whether an end user computing device has a high priority need or a low priority need for radar data (e.g., weather radar data); and/or one of: (a) if the end user computing device has the low priority need for the radar data, route, via a datalink (e.g., a low bandwidth datalink or a high bandwidth datalink; e.g., a wired or wireless datalink), a portion of the radar data having a reduced size and/or reduced amount of the radar data to the end user computing device, or (b) if the end user computing device has the high priority need for the radar data, route, via a datalink (e.g., a low bandwidth datalink or a high bandwidth datalink), an amount of the radar data to the end user computing device so as to fulfill the high priority need for the radar data. For example, the processor 302 of the computing device 106 may be configured to: receive or generate radar data (e.g., weather radar data) based on signals received by the radar receiver 401; identify an end user computing device 112 to receive at least a portion of the radar data (e.g., weather radar data); determine whether the end user computing device 112 has a high priority need for the weather radar data or a low priority need for the weather radar data, wherein the low priority need is relatively low as compared to the high priority need, wherein for the low priority need, the at least the portion of the weather radar data is a portion of the weather radar data having a reduced size and/or reduced amount of the weather radar data that satisfies a low priority weather radar data need of the end user computing device 112, wherein for the high priority need, a size and/or amount of the at least the portion of the weather radar data is more than the reduced size and/or reduced amount associated with the low priority weather radar data need so as to satisfy a high priority weather radar data need of the end user computing device 112; reduce a size and/or an amount of the weather radar data to be the portion of the weather radar data; and/or upon a determination that the end user computing device 112 has a low priority need for the weather radar data, route, via a datalink, the portion of the weather radar data having the reduced size and/or reduced amount of the weather radar data to the end user computing device 112.

Figure 5:
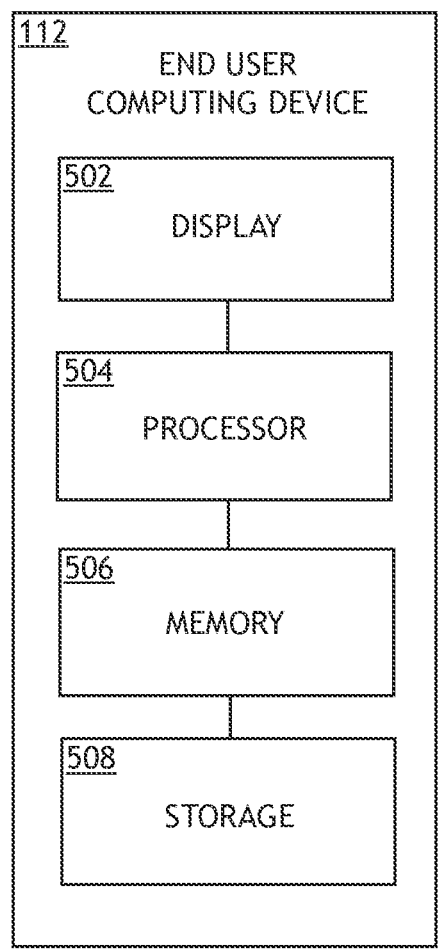
FIG. 5 is a view of an exemplary embodiment of an end user computing device of the system of FIG. 1 according to the inventive concepts disclosed herein

Each of the at least one end user computing device 112 may be implemented as any suitable computing device configured to receive weather radar data from the aircraft 102 via any suitable datalink(s) (e.g., wired and/or wireless datalinks) and use such weather radar data; such devices 112 may include electronic flight bags (EFBs) on an aircraft, other aircraft, ground based devices 112 (e.g., weather radar aggregators, airlines, al Oceanic and Atmospheric Administration (NOAA), and/or etc.). In some embodiments, at least one end user computing device 112 may be implemented on the aircraft 102, implemented on another vehicle (e.g., another aircraft 114), and/or implemented on the ground. Each end user computing device 112 may have a priority need (e.g., a high priority need or a relatively low priority need) assigned to said device 112. Examples of end user computing devices 112 having high priority needs may include: devices 112 using weather radar data as inputs to meteorological model(s) and/or a VSD of an electronic flight bag (EFB). Examples of end user computing devices 112 having low priority needs may include: ATC and/or dispatch end user computing devices 112 that use the weather radar data as decision aids and/or end user computing devices 112 that use the weather radar data for general threat awareness. As shown in FIG. 5, each end user computing device 112 may include at least one display 502, at least one processor 504, at least one memory 506, and/or at least one storage 508, some or all of which may be communicatively coupled at any given time. For example, the at least one processor 504 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 504 may include a CPU and a GPU configured to perform (e.g., collectively perform) any of the operations disclosed throughout. The processor 504 may be configured to run various software applications (e.g., a weather radar display application, a meteorological application, an ATC or dispatch application, and/or a threat application) or computer code stored (e.g., maintained) in a non-transitory computer-readable medium (e.g., memory 506 and/or storage 508) and configured to execute various instructions or operations. The processor 504 may be configured to perform any or all of the operations disclosed throughout. For example, the processor 504 may be configured to: receive radar data (e.g., weather radar data). The display 502 may be configured to display graphical information associated with the radar data (e.g., the weather radar data).

The at least one radar computing device 108 may be implemented as any suitable computing device, such as a weather radar computing device (e.g., an ESA weather radar computing device and/or an ESA automatic weather radar computing device). The at least one radar computing device 108 may include any or all of the elements shown in FIG. 4. For example, the radar computing device 108 may include at least one radar antenna and/or at least one receiver 401 (e.g., at least one weather radar antenna (e.g., at least one ESA weather radar antenna or at least one ESA automatic weather radar antenna) and/or at least one weather radar receiver), at least one processor 402, at least one memory 404, and/or at least one storage 406, some or all of which may be communicatively coupled at any given time. For example, the at least one processor 402 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 402 may include a CPU and a GPU configured to perform (e.g., collectively perform) any of the operations disclosed throughout. The processor 402 may be configured to run various software applications (e.g., a radar application) or computer code stored (e.g., maintained) in a non-transitory computer-readable medium (e.g., memory 404 and/or storage 406) and configured to execute various instructions or operations. The computer-readable medium (e.g., memory 404 and/or storage 406) may maintain a data structure (e.g., a table), wherein the data structure may contain predetermined priority information associated with high priority needs for weather radar data, low priority needs for weather radar data, low priority levels of threats, and/or high priority levels of threats. The processor 402 of the radar computing device 108 may be configured to perform any or all of the operations disclosed throughout. For example, the processor 402 of the computing device 106 may be configured to: determine whether an end user computing device has a high priority need or a low priority need for radar data (e.g., weather radar data); and/or one of: (a) if the end user computing device has the low priority need for the radar data, route, via a datalink (e.g., a low bandwidth datalink or a high bandwidth datalink; e.g., a wired or wireless datalink), a portion of the radar data having a reduced size and/or reduced amount of the radar data to the end user computing device, or (b) if the end user computing device has the high priority need for the radar data, route, via a datalink (e.g., a low bandwidth datalink or a high bandwidth datalink), an amount of the radar data to the end user computing device so as to fulfill the high priority need for the radar data. For example, the processor 402 of the computing device 106 may be configured to: receive or generate radar data (e.g., weather radar data) based on signals received by the radar receiver 401; identify an end user computing device 112 to receive at least a portion of the radar data (e.g., weather radar data); determine whether the end user computing device 112 has a high priority need for the weather radar data or a low priority need for the weather radar data, wherein the low priority need is relatively low as compared to the high priority need, wherein for the low priority need, the at least the portion of the weather radar data is a portion of the weather radar data having a reduced size and/or reduced amount of the weather radar data that satisfies a low priority weather radar data need of the end user computing device 112, wherein for the high priority need, a size and/or amount of the at least the portion of the weather radar data is more than the reduced size and/or reduced amount associated with the low priority weather radar data need so as to satisfy a high priority weather radar data need of the end user computing device 112; reduce a size and/or an amount of the weather radar data to be the portion of the weather radar data; and/or upon a determination that the end user computing device 112 has a low priority need for the weather radar data, route, via a datalink, the portion of the weather radar data having the reduced size and/or reduced amount of the weather radar data to the end user computing device 112.

For example, at least one processor (e.g., the at least one processor 204, the at least one processor 302, and/or the at least one processor 402) may be configured to (e.g., collectively configured to, if more than one processor): receive or generate radar data (e.g., weather radar data) based on signals received by the radar receiver 401; identify an end user computing device 112 to receive at least a portion of the radar data (e.g., weather radar data); determine whether the end user computing device 112 has a high priority need for the weather radar data or a low priority need for the weather radar data, wherein the low priority need is relatively low as compared to the high priority need, wherein for the low priority need, the at least the portion of the weather radar data is a portion of the weather radar data having a reduced size and/or reduced amount of the weather radar data that satisfies a low priority weather radar data need of the end user computing device 112, wherein for the high priority need, a size and/or amount of the at least the portion of the weather radar data is more than the reduced size and/or reduced amount associated with the low priority weather radar data need so as to satisfy a high priority weather radar data need of the end user computing device 112; reduce a size and/or an amount of the weather radar data to be the portion of the weather radar data; and/or upon a determination that the end user computing device 112 has a low priority need for the weather radar data, route, via a datalink, the portion of the weather radar data having the reduced size and/or reduced amount of the weather radar data to the end user computing device 112.

In some embodiments, at least one processor (e.g., the at least one processor 204, the at least one processor 302, and/or the at least one processor 402) of the aircraft 102 may be further configured to perform (e.g., collectively perform, if more than one processor): reduce the size and/or the amount of the weather radar data to be the portion of the weather radar data by compressing and/or down-sampling the weather radar data to be the portion of the weather data. Exemplary compression algorithms may include run-length limited (RLL) compression and/or Zstandard (ZSTD) compression.

In some embodiments, at least one processor (e.g., the at least one processor 204, the at least one processor 302, and/or the at least one processor 402) of the aircraft 102 may be further configured to perform (e.g., collectively perform, if more than one processor): reduce the size and/or the amount of the weather radar data to be the portion of the weather radar data by decimating the weather radar data to be the portion of the weather data. In some embodiments, at least one processor (e.g., the at least one processor 204, the at least one processor 302, and/or the at least one processor 402) of the aircraft 102 may be further configured to perform (e.g., collectively perform, if more than one processor): reduce the size and/or the amount of the weather radar data to be the portion of the weather radar data by decimating the weather radar data to be the portion of the weather data through a process of selecting only valid radials and/or bins of the weather data associated with providing a broader view of a detected weather radar threat.

In some embodiments, the datalink is one of at least two available datalinks between the end user computing device and the at least one processor, wherein each of the at least two available datalinks is either a high bandwidth datalink or a low bandwidth datalink, wherein the low bandwidth datalink has a relatively low bandwidth as compared to the high bandwidth datalink. In some embodiments, the high bandwidth datalink is capable of communicating in real time the size and/or amount of the at least the portion of the weather radar data associated with the high priority need, wherein the low bandwidth datalink is capable of communicating in real time less than the size and/or amount of the at least the portion of the weather radar data associated with the high priority need. In some embodiments, the datalink is the low bandwidth datalink, wherein the reduced size and/or the amount of the weather radar data is transmissible in real time via the low bandwidth datalink. In some embodiments, the low bandwidth datalink is a very high frequency (VHF) datalink. In some embodiments, the datalink is the high bandwidth datalink, wherein the high bandwidth datalink is one of a satellite communication (SATCOM) datalink, an ethernet datalink, or a wireless fidelity (WiFi) datalink. In some embodiments, the high priority need for the weather radar data includes input to a meteorological model or a vertical situation display (VSD). In some embodiments, the low priority need for the weather radar data includes a decision aid for air traffic control (ATC) or threat awareness as to an existence of a threat. In some embodiments, the end user computing device 112, is one of: an electronic flight bag (EFB) onboard the aircraft 102; another aircraft 114; or a ground-based end user computing device 112.

In some embodiments, at least one processor (e.g., the at least one processor 204, the at least one processor 302, and/or the at least one processor 402) of the aircraft 102 may be further configured to perform (e.g., collectively perform, if more than one processor): detect a threat within the weather radar data; determine whether the threat has a high priority level or a low priority level, wherein the low priority level is relatively low as compared to the high priority level; and/or upon a determination that the threat has the low priority level, at least one of: compress the at least the portion of the weather radar data, down-sample the at least the portion of the weather radar data, or route the at least the portion of the weather radar data over the low bandwidth datalink.

In some embodiments, at least one processor (e.g., the at least one processor 204, the at least one processor 302, and/or the at least one processor 402) of the aircraft 102 may be further configured to perform (e.g., collectively perform, if more than one processor): detect a threat within the weather radar data; determine whether the threat has a high priority level or a low priority level, wherein the low priority level is relatively low as compared to the high priority level; and/or upon a determination that the threat has the high priority level, at least one of: compress the at least the portion of the weather radar data based on the high priority level, down-sample the at least the portion of the weather radar data based on the high priority level, route the at least the portion of the weather radar data over the high bandwidth datalink, or instruct the at least the portion of the weather radar data to be sent in bursts.

At least one processor (e.g., the at least one processor 204, the at least one processor 302, and/or the at least one processor 402) of the aircraft 102 may be configured to perform (e.g., collectively perform, if more than one processor) any or all of the operations disclosed throughout.

Figure 6:
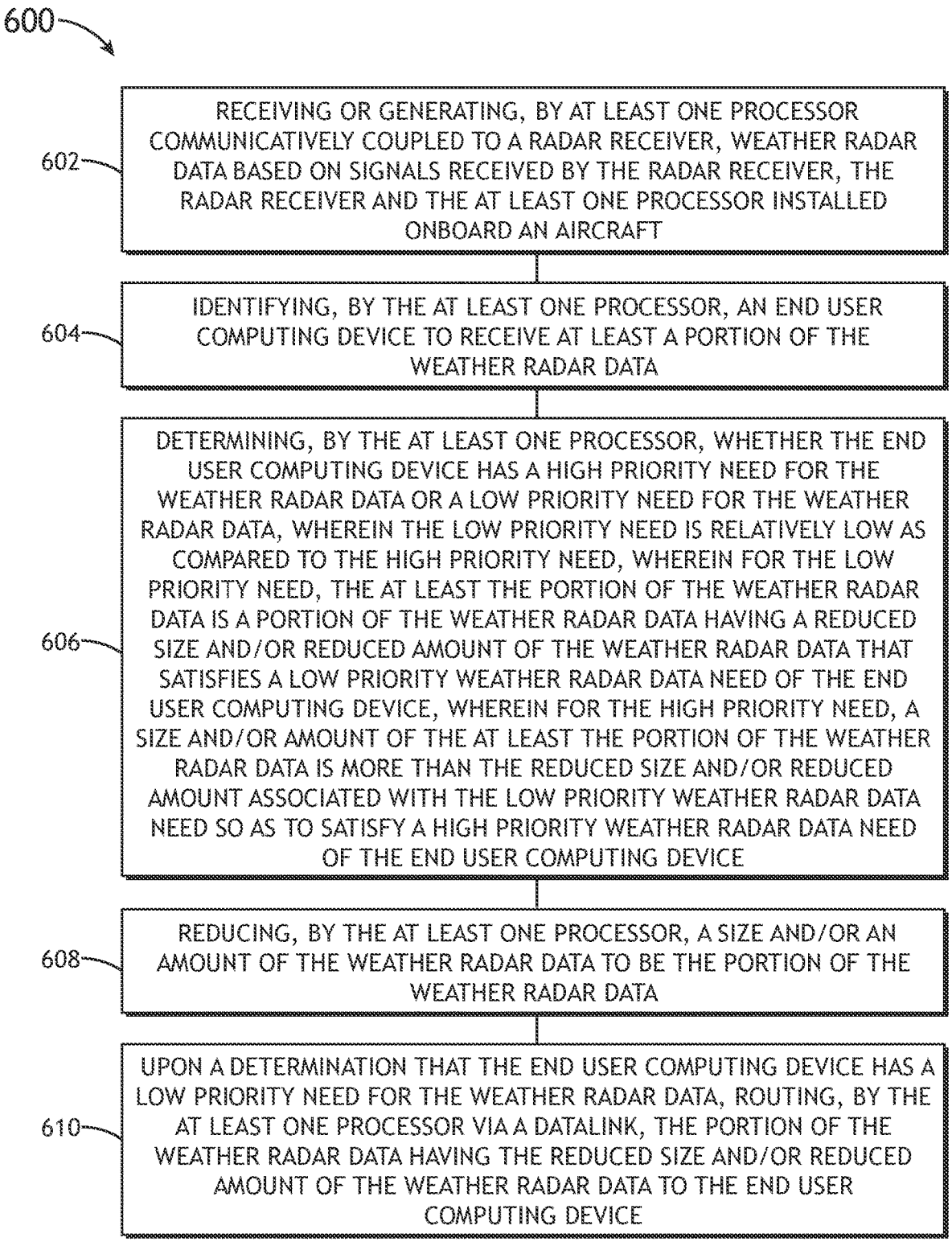
FIG. 6 is a diagram of an exemplary embodiment of a method according to the inventive concepts disclosed herein.

Referring now to FIG. 6, an exemplary embodiment of a method 600 according to the inventive concepts disclosed herein may include one or more of the following steps. Additionally, for example, some embodiments may include performing one or more instances of the method 600 iteratively, concurrently, and/or sequentially. Additionally, for example, at least some of the steps of the method 600 may be performed in parallel and/or concurrently. Additionally, in some embodiments, at least some of the steps of the method 600 may be performed non-sequentially.

A step 602 may include receiving or generating, by at least one processor communicatively coupled to a radar receiver, weather radar data based on signals received by the radar receiver, the radar receiver and the at least one processor installed onboard an aircraft.

A step 604 may include identifying, by the at least one processor, an end user computing device to receive at least a portion of the weather radar data.

A step 606 may include determining, by the at least one processor, whether the end user computing device has a high priority need for the weather radar data or a low priority need for the weather radar data, wherein the low priority need is relatively low as compared to the high priority need, wherein for the low priority need, the at least the portion of the weather radar data is a portion of the weather radar data having a reduced size and/or reduced amount of the weather radar data that satisfies a low priority weather radar data need of the end user computing device, wherein for the high priority need, a size and/or amount of the at least the portion of the weather radar data is more than the reduced size and/or reduced amount associated with the low priority weather radar data need so as to satisfy a high priority weather radar data need of the end user computing device.

A step 608 may include reducing, by the at least one processor, a size and/or an amount of the weather radar data to be the portion of the weather radar data.

A step 610 may include upon a determination that the end user computing device has a low priority need for the weather radar data, routing, by the at least one processor via a datalink, the portion of the weather radar data having the reduced size and/or reduced amount of the weather radar data to the end user computing device.

Further, the method 600 may include any of the operations disclosed throughout.

As will be appreciated from the above, embodiments of the inventive concepts disclosed herein may be directed to a system (e.g., an aircraft system) and a method configured to: determine whether an end user computing device has a high priority need or a low priority need for radar data (e.g., weather radar data); and one of: (a) if the end user computing device has the low priority need for the radar data, route, via a datalink (e.g., a low bandwidth datalink or a high bandwidth datalink), a portion of the radar data having a reduced size and/or reduced amount of the radar data to the end user computing device, or (b) if the end user computing device has the high priority need for the radar data, route, via a datalink (e.g., a low bandwidth datalink or a high bandwidth datalink), an amount of the radar data to the end user computing device so as to fulfill the high priority need for the radar data.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a radar receiver installed onboard an aircraft; and
at least one processor communicatively coupled to the radar receiver, the at least one processor installed onboard the aircraft, the at least one processor configured to:
receive or generate weather radar data based on signals received by the radar receiver;
identify an end user computing device to receive at least a portion of the weather radar data;
determine whether the end user computing device has a high priority need for the weather radar data or a low priority need for the weather radar data, wherein the low priority need is relatively low as compared to the high priority need, wherein for the low priority need, the at least the portion of the weather radar data is a portion of the weather radar data having a reduced size and/or reduced amount of the weather radar data that satisfies a low priority weather radar data need of the end user computing device, wherein for the high priority need, a size and/or amount of the at least the portion of the weather radar data is more than the reduced size and/or reduced amount associated with the low priority weather radar data need so as to satisfy a high priority weather radar data need of the end user computing device;
reduce a size and/or an amount of the weather radar data to be the portion of the weather radar data by decimating the weather radar data to the portion of the weather data through a process of selecting only valid radials and/or bins of the weather data associated with providing a broader view of a detected weather radar threat; and
upon a determination that the end user computing device has the low priority need for the weather radar data, route, via a datalink, the portion of the weather radar data having the reduced size and/or reduced amount of the weather radar data to the end user computing device.

2. The system of claim 1, wherein the datalink is one of at least two available datalinks between the end user computing device and the at least one processor, wherein each of the at least two available datalinks is either a high bandwidth datalink or a low bandwidth datalink, wherein the low bandwidth datalink has a relatively low bandwidth as compared to the high bandwidth datalink.

3. The system of claim 2, wherein the high bandwidth datalink is capable of communicating in real time the size and/or amount of the at least the portion of the weather radar data associated with the high priority need, wherein the low bandwidth datalink is capable of communicating in real time less than the size and/or amount of the at least the portion of the weather radar data associated with the high priority need.

4. The system of claim 3, wherein the datalink is the low bandwidth datalink, wherein the reduced size and/or the amount of the weather radar data is transmissible in real time via the low bandwidth datalink.

5. The system of claim 4, wherein the low bandwidth datalink is a very high frequency (VHF) datalink.

6. The system of claim 3, wherein the datalink is the high bandwidth datalink, wherein the high bandwidth datalink is one of a satellite communication (SATCOM) datalink, an ethernet datalink, or a wireless fidelity (WiFi) datalink.

7. The system of claim 2, wherein the high priority need for the weather radar data includes input to a meteorological model or a vertical situation display (VSD).

8. The system of claim 2, wherein the low priority need for the weather radar data includes a decision aid for air traffic control (ATC) or threat awareness as to an existence of a threat.

9. The system of claim 2, wherein the end user computing device, is one of: an electronic flight bag (EFB) onboard the aircraft; another aircraft; or a ground-based end user computing device.

10. The system of claim 2, wherein the at least one processor is further configured to:
detect a threat within the weather radar data;
determine whether the threat has a high priority level or a low priority level, wherein the low priority level is relatively low as compared to the high priority level; and
upon a determination that the threat has the low priority level, at least one of: compress the at least the portion of the weather radar data, down-sample the at least the portion of the weather radar data, or route the at least the portion of the weather radar data over the low bandwidth datalink.

11. The system of claim 2, wherein the at least one processor is further configured to:
detect a threat within the weather radar data;
determine whether the threat has a high priority level or a low priority level, wherein the low priority level is relatively low as compared to the high priority level; and
upon a determination that the threat has the high priority level, at least one of: compress the at least the portion of the weather radar data based on the high priority level, down-sample the at least the portion of the weather radar data based on the high priority level, route the at least the portion of the weather radar data over the high bandwidth datalink, or instruct the at least the portion of the weather radar data to be sent in bursts.

12. A method, comprising:
receiving or generating, by at least one processor communicatively coupled to a radar receiver, weather radar data based on signals received by the radar receiver, the radar receiver and the at least one processor installed onboard an aircraft;
identifying, by the at least one processor, an end user computing device to receive at least a portion of the weather radar data;
determining, by the at least one processor, whether the end user computing device has a high priority need for the weather radar data or a low priority need for the weather radar data, wherein the low priority need is relatively low as compared to the high priority need, wherein for the low priority need, the at least the portion of the weather radar data is a portion of the weather radar data having a reduced size and/or reduced amount of the weather radar data that satisfies a low priority weather radar data need of the end user computing device, wherein for the high priority need, a size and/or amount of the at least the portion of the weather radar data is more than the reduced size and/or reduced amount associated with the low priority weather radar data need so as to satisfy a high priority weather radar data need of the end user computing device;
reducing, by the at least one processor, a size and/or an amount of the weather radar data to be the portion of the weather radar data by decimating the weather radar data to the portion of the weather data through a process of selecting only valid radials and/or bins of the weather data associated with providing a broader view of a detected weather radar threat; and
upon a determination that the end user computing device has the low priority need for the weather radar data, routing, by the at least one processor via a datalink, the portion of the weather radar data having the reduced size and/or reduced amount of the weather radar data to the end user computing device.

13. A system, comprising:
a radar receiver installed onboard an aircraft; and
at least one processor communicatively coupled to the radar receiver, the at least one processor installed onboard the aircraft, the at least one processor configured to:
receive or generate weather radar data based on signals received by the radar receiver;
identify an end user computing device to receive at least a portion of the weather radar data;
determine whether the end user computing device has a high priority need for the weather radar data or a low priority need for the weather radar data, wherein the low priority need is relatively low as compared to the high priority need, wherein for the low priority need, the at least the portion of the weather radar data is a portion of the weather radar data having a reduced size and/or reduced amount of the weather radar data that satisfies a low priority weather radar data need of the end user computing device, wherein for the high priority need, a size and/or amount of the at least the portion of the weather radar data is more than the reduced size and/or reduced amount associated with the low priority weather radar data need so as to satisfy a high priority weather radar data need of the end user computing device;
reduce a size and/or an amount of the weather radar data to be the portion of the weather radar data;
upon a determination that the end user computing device has the low priority need for the weather radar data, route, via a datalink, the portion of the weather radar data having the reduced size and/or reduced amount of the weather radar data to the end user computing device, wherein the datalink is one of at least two available datalinks between the end user computing device and the at least one processor, wherein each of the at least two available datalinks is either a high bandwidth datalink or a low bandwidth datalink, wherein the low bandwidth datalink has a relatively low bandwidth as compared to the high bandwidth datalink;

detect a threat within the weather radar data;

determine whether the threat has a high priority level or a low priority level, wherein the low priority level is relatively low as compared to the high priority level; and upon a determination that the threat has the high priority level, at least one of: compress the at least the portion of the weather radar data based on the high priority level, down-sample the at least the portion of the weather radar data based on the high priority level, route the at least the portion of the weather radar data over the high bandwidth datalink, or instruct that the at least the portion of the weather radar data be sent in bursts.

* * * * *